United States Patent [19]

Brown et al.

[11] 4,073,748

[45] Feb. 14, 1978

[54] METHOD FOR PREPARING WETPROOFED CATALYST PARTICLES AND PARTICLES PRODUCED THEREBY

[75] Inventors: Glendon W. Brown; Mary Jane Fine, both of Chillicothe; Larry O. Hill, Frankfort, all of Ohio

[73] Assignee: The Mead Corporation, Dayton, Ohio

[21] Appl. No.: 761,264

[22] Filed: Jan. 21, 1977

[51] Int. Cl.$^2$ .............................................. B01J 31/06
[52] U.S. Cl. ...................................... 252/428; 423/562
[58] Field of Search ................................. 252/428, 444

[56] References Cited

U.S. PATENT DOCUMENTS 3,395,049  7/1968  Thompson ........................... 252/428
4,001,385  1/1977  Sanders ........................... 252/428 X
4,024,229  5/1977  Smith et al. ...................... 252/428 X

*Primary Examiner*—Patrick P. Garvin
*Attorney, Agent, or Firm*—Biebel, French & Nauman

[57] ABSTRACT

Carbon particles non-uniformly and non-continuously coated with polytetrafluoroethylene (PTFE) are produced by adding a PTFE emulsion to the carbon particles at a rate of less than approximately 100ml/100 grams. The result is a mixture of PTFE coated carbon particles, some having a higher weight percent PTFE resin thereon and others having a lower weight percent PTFE resin thereon. Such a mixture of non-uniformly coated particles gives improved reaction efficiency when used as a solid catalyst in a packed bed tower reactor through which fluid reactants are flowed.

6 Claims, No Drawings

METHOD FOR PREPARING WETPROOFED CATALYST PARTICLES AND PARTICLES PRODUCED THEREBY

BACKGROUND OF THE INVENTION

This invention relates to a method for preparing wetproofed catalyst particles and, more particularly, to a method for non-uniformly depositing polytetrafluoroethylene resin on carbon particles.

Recently it has been proposed to use wetproofed catalyst particles to promote a number of different redox reactions between two fluid phases, at least one of which is an aqueous liquid. An advantage to using wetproofed catalyst particles to promote such reactions is that the wetproofed catalyst particles are not "flooded" by the aqueous liquid phase. This is because coating of hydrophobic material on the catalyst surfaces is accomplished in a discontinuous manner.

Take, for example, the oxidation of liquid sodium sulfide to sodium polysulfide. When introduced, the liquid sodium sulfide reactant will completely surround all of the surfaces of the catalyst but it will not wet the treated portions (those coated with the hydrophobic material). That is, the contact angle between the liquid and the hydrophobic material is so high and the surface adhesion so slight that when the oxidant gas is introduced, it will readily displace the liquid in the wetproofed areas of the catalyst. The adjacent uncoated areas of the catalyst surface will, on the other hand, be wet by the liquid sodium sulfide. This, then, forms the requisite locus of interfacial contact between the gaseous oxidant, liquid sodium sulfide reductant, and catalyst surface. It eliminates the need for the gas to diffuse through the liquid which would otherwise "flood" the surface of the catalyst and thus increases the rate of reaction.

This advantage and others are all discussed in detail in the Smith and Sanders patents, assigned to the assignee of the present invention. Illustrative are Canadian Pat. Nos. 944,535, issued Apr. 2, 1974; 959,628, issued Dec. 24, 1974; 959,821, issued Dec. 24, 1974; and 963,633, issued Mar. 4, 1975.

The use of hydrophobic treated catalyst particles in other contexts is also known. See, for example, Stevens Canadian Pat. Nos. 907,292, issued Aug. 15, 1972, and 941,134, issued Feb. 5, 1974. In the former, Stevens discloses using a catalyst having a coating directly thereon to promote a process for enriching a fluid with hydrogen isotopes. In the latter, a porous hydrophobic support material having catalyst particles thereon is used in such a heavy water production process.

See also, Butler Canadian Pat. No. 700,933 and Fleck U.S. Pat. No. 2,722,504. Butler describes a system for the electrolysis of sodium chloride brine in which the cathode is porous and supplied with oxygen gas to prevent formation or evolution of hydrogen. In one form, the cathode compartment contains a slurry of particulate solids which is agitated by the air stream or by mechanical agitation. The particulate material may be graphite and coated with a hydrophobic material such as polytetrafluoroethylene. The Fleck patent relates to conducting petro-chemical reactions with a solid catalyst material that has a minor amount of silicone resin on its surface. The vapor phase reactions disclosed in Fleck are isomerization, desulfurization, hydrogenation, hydroforming, reforming hydrocracking, destructive hydrogenation and the like.

All of these patentees apparently use a uniform mixture of treated catalysts in terms of the amount of hydrophobic material on the catalyst particles. Thus, several suggest applying a certain weight percent within a range, but none disclose any differential application of hydrophobic material nor is one likely to be achieved absent specialized procedures to do so. This is an important consideration.

As disclosed in the Smith and Sanders patents, a preferred manner of using the wetproofed catalyst particles is to pack them in a fixed bed within a tower reactor. The reactants are then flowed either concurrently or countercurrently through the reactor. The flow characteristics of the reactants through the reactor depend somewhat on the amount of hydrophobic material deposited on the catalyst particles. The catalysts treated with higher weight percent amounts of hydrophobic material offer less resistance to fluid flow than those having been treated with lower weight percent amounts. But, generally the higher the amount of hydrophobic material, the more the catalyst surface is occluded and the less reactive the catalyst.

In the production of polysulfide, for instance, both the activity of the catalyst and flow resistance characteristics are important commercial considerations in terms of the efficiency of the reactor and the amount of polysulfide produced. Accordingly, the need exists for a wetproofed catalyst which will decrease the flow resistance characteristics without significantly decreasing the reactivity — that is, a wetproofed catalyst which is more efficient than the uniformly treated catalysts of the prior art.

SUMMARY OF THE INVENTION

That need is fulfilled by the wetproofed catalyst particles produced by the method of the present invention. The polytetrafluoroethylene (PTFE) treated carbon particles prepared by the instant process are uniquely suited for use in a packed bed column reactor, giving an improved efficiency when compared to the wetproofed catalyst particles of the prior art. This is believed to be because of the non-uniform coating achieved with this process so that even when a fixed weight percent of PTFE is measured out and applied, not all the carbon particles will have that amount of PTFE on their surface. Some will have a larger amount of PTFE, some a lesser amount. The result is what appears to be somewhat random mixture of PTFE weight percent coatings. This is to be also distinguished from a fixed mixture of uniformly coated catalyst particles having different amounts of hydrophobic material on their surfaces.

It is achieved by controlling the volume of water in the PTFE emulsion which is applied to the carbon particles in an amount less than that which will be picked up by the absorbent carbon particles. It is theorized that only the first portion of the carbon particles coming in contact with the water in the mixing vessel absorb most of the water. As they become water saturated the PTFE solids in the aqueous emulsion will be carried with that water and deposited primarily on these initial water-absorbing carbon particles. The carbon particles for which there is not enough water remaining for saturation will have a lesser chance of contact with the PTFE solids and so will have lesser amounts coated on their surfaces.

Various degrees of coating are believed to be produced in this manner as well, although the exact figures are not known. Under microscope some carbon grains seem to be almost completely encapsulated with PTFE and others have only small spots of PTFE widely scattered.

The carbon particles used may be either activated or unactivated carbon. Preferred are ones having a particle size of between 2 and 30 mesh and most preferred are 4 × 10 mesh particles. The weight percentage (on a dry solids basis) of PTFE (averaged over all the carbon particles) which may be applied in this manner may be varied, but preferred are amounts within the range 0.6–20 percent. More preferred is 2–10 percent and most preferred is 6–8 percent.

The desired amount of PTFE solids is determined and the volume of emulsion containing that amount weighed out. This is then diluted with water to give a liquid volume to carbon particle weight ratio of less than that required for saturation. In the case of the preferred carbon particles of the size mentioned this is less than approximately 100ml/100 grams. At this liquid level or below there is less liquid present than the saturation capacity of the carbon particles. At less than approximately 50ml/100 grams or even approximately 25ml/100 grams there is even a greater shortage of water present and so even a more non-uniform mixture of wetproofed carbon particles results. As long as there is sufficient liquid volume to maintain the PTFE solids in suspension and form flowable liquid, then the non-uniform distribution of the present invention is possible. This level may be as low as 0.5ml/100 grams.

The proper volume of aqueous emulsion as determined per the above considerations is mixed with the carbon particles. This may be simply by adding the liquid to the carbon particle mass and stirring, or spraying the liquid onto the particles and tumbling, or combinations thereof, or any other mixing procedure. The actual mixing method is unimportant since the control of liquid volume introduced and the absorbency of the carbon will in and of themselves give the non-uniform PTFE distribution on the catalyst particles.

Next, the carbon particles after being mixed with the PTFE emulsion are heated for a sufficient period of time to drive off the water from the aqueous emulsion and to set the PTFE resin as deposited non-uniformly and non-continuously on the carbon particles. The heat may also drive off some of the wetting agent present in the PTFE emulsion, but this is not critical since once dried by water removal, the resin is sufficiently set and any residual wetting agent will be washed out in use.

The result is the mixture of non-uniformly coated carbon particles desired. It has been found that such particles when used in a column reactor for sodium polysulfide production, for example, increase the efficiency in terms of percent of sodium sulfide converted to polysulfide rather than thiosulfate and the rate of polysulfide production. In polysulfide pulping an increased conversion to polysulfide is significant commercially. As an illustration, in a 500 ton per day hardwood kraft pulp mill using a white liquor sulfidity of 25% and 16% active alkali applied on the O.D. wood, a 60% polysulfide oxidation efficiency would give a 0.89% S° on O.D. wood and a 1.07% (11 tons/day) increased pulp production. However, a 70% efficiency would give a 1.04% S° O.D. wood and a 1.25% (13 tons/day) increased pulp production. While an 80% efficiency gives a 1.19% S° on O.D. wood and a 1.43% (15 tons/day) increased pulp production. The wetproofed carbon particles of the present invention will give a 10% or more improvement in polysulfide oxidation efficiency compared to uniformly coated catalyst particles.

Accordingly, it is an object of the present invention to provide non-uniformly PTFE coated carbon particles of improved efficiency.

Another object of the present invention is to provide a method for preparing such non-uniformly PTFE coated carbon particles.

Other objects and advantages of the invention will be apparent from the following description and the appended claims.

DESCRIPTION OF THE PREFERRED EMBODIMENTS

A preferred method of the instant invention is as follows:

a. Fifty pounds (22,680 grams) of carbon such as 4 × 10 BPL activated carbon from Pittsburgh Activated Carbon Co. is placed in a Marion Mixer, manufactured by Rapids Machinery Co., Marion, Iowa.

b. PTFE emulsion is introduced through a nozzle. For an approximately 6% by weight of PTFE dry solids at a 25 ml/100 gram liquid amount, this would mean that 1500 ml of a 60% solids (at a 1.5 specific gravity) PTFE emulsion such as Teflon Suspension 852-200 from E. I. duPont de Nemours & Co. is diluted with approximately 4200 ml water to give 5700 ml liquid which is added to the carbon particles.

c. The combined carbon particles and PTFE emulsion are stirred in the Marion Mixer for approximately 4 minutes.

d. After mixing, the treated particles are dumped in a shallow tray and put into an oven heated at approximately 375° F.

e. The treated particles are heated for around 30 minutes or until dry (i.e., the water from the emulsion is driven off).

f. Finally, the treated particles are removed from the oven and cooled. They are now ready for use.

The resultant particles have a non-uniform, non-continuous PTFE coating on the carbon. Some show almost but not quite complete PTFE encapsulation, in others very little PTFE appears on the surface, and others have intermediate amounts. Since at liquid levels of less than 100 ml/100 grams there is no excess water (but rather a deficit) beyond the saturation point of carbon absorption, no liquid is drained off. Therefore, all of the PTFE ends up coated on the surface of the carbon particles. However, a random non-uniform, non-continuous coating results.

Of course, materials and amounts other than the most preferred as given in the illustration above are usable. Other carbons within the range 2–30 mesh may be used; another example is 12 × 30 BPL carbon; another is 8 × 30 mesh SGL carbon. As mentioned previously the PTFE percent on a dry solids weight basis is preferably between 0.6 and 20 percent. The 60% solids duPont material mentioned is also only preferred. Others such as Fluon GP-1 from ICI United States, Inc., Wheeling, Ill., could also be used. Teflon Suspension 852-200 is a dispersion of hydrophobic, negatively charged colloids containing particles of 0.05 to 0.5 microns diameter suspended in water. It contains a small amount (around 6%) of Triton X-100 from Rohm & Haas, Bristol, Pa., as a non-ionic wetting agent.

The emulsion is diluted with water to give the proper amount for mixing with the carbon particles. Critical is the fact that the amount of water added does not result in a liquid addition of over 100 ml/100 grams. More preferred is a liquid amount of less than 50ml/100 grams and most preferred is approximately 25ml/100 grams. If the 100ml/100 grams limit is exceeded then there will be generally more than enough water to saturate all of the carbon particles. As such, unless very specialized mixing procedures are used, an essentially uniform non-continuous PTFE distribution through the carbon particles will result. The carbon particles will not be encapsulated by the PTFE, but rather each in theory would have the chosen weight percent (such as 6%) PTFE on its surface. While this produces a workable wetproofed catalyst, that material does not have the unique features of the present one.

The mixing time and method are not critical. Variations thereof have failed to evidence any substantial effect on the wetproofed carbon produced unless exotic procedures are utilized. Likewise, the oven temperature and heating time are also not critical as long as the melting point of the PTFE is not exceeded. All that is important is that it be long enough and at a sufficient temperature to drive off the moisture present. Obviously, the lower the temperature used, the longer the heating time necessary.

EXAMPLE

Using the above method various sets of wetproofed carbon particles were prepared. In each 4 × 10 BPL activated carbon was used and all that was varied was (a) the percent PTFE resin on a dry solids basis and (b) the amount of liquid in ml per 100 grams of carbon particles. This is set forth in Table I below. All other procedures as illustrated above were the same.

| Material No. | % PTFE | Liquid ml/100g |
|---|---|---|
| 1 | 4.2 | 75 |
| 2 | 6.5 | 100 |
| 3 | 6.5 | 50 |
| 4 | 2.0 | 50 |
| 5 | 2.0 | 100 |
| 6 | 7.5 | 75 |
| 7 | 0.9 | 75 |
| 8 | 4.2 | 125 |
| 9 | 4.2 | 25 |
| 10 | 7.5 | 25 |

Those sets of wetproofed carbon particles were then used in a pilot reactor for oxidizing sodium sulfide liquor to produce sodium polysulfide. Synthetic liquors were prepared. The reaction conditions are set forth in Table II, below:

TABLE II

| | |
|---|---|
| Bed Depth | 11.7 ft. |
| Liquor Flow Rate | 7.5 GPM/Ft.$^2$ |
| Inlet Liquor Temperature | 180° F |
| Inlet Liquor Sulfide Conc. | .75M ⎫ Synthetic Liquor |
| Inlet Liquor Hydroxide Conc. | 2.0M ⎭ |
| Air Flow Rates 10,20,30,40,50 and 60 SCFM/Ft.$^2$ | |
| Concurrent Down Flow Configuration | |

The output was measured for polysulfide production and the results are set forth in Table III as follows:

TABLE III

| Material #1 | | % PTFE 4.2 | Liquid 75ml/100g. | | | |
|---|---|---|---|---|---|---|
| Air Flow Rates SCFM/FT$^2$ | 10 | 20 | 30 | 40 | 50 | 60 |
| Polysulfide Produced Moles | .076 | .161 | .218 | .246 | .272 | .226 |
| As glp S° | 2.43 | 5.15 | 6.98 | 7.87 | 8.70 | 7.23 |
| Material #2 | | % PTFE 6.5 | Liquid 100 ml/100g. | | | |
| Air Flow Rates SCFM/FT.$^2$ | 10 | 20 | 30 | 40 | 50 | 60 |
| Polysulfide Produced Moles | .054 | .102 | .085 | .077 | .064 | .057 |
| As gpl S° | 1.73 | 3.26 | 2.72 | 2.46 | 2.05 | 1.82 |
| Material #3 | | % PTFE 6.5 | Liquid 50ml/100g. | | | |
| Air Flow Rates SCFM/Ft.$^2$ | 10 | 20 | 30 | 40 | 50 | 60 |
| Polysulfide Produced Moles | .080 | .164 | .241 | .292 | .327 | .296 |
| As gpl S° | 2.56 | 5.25 | 7.71 | 9.34 | 10.46 | 9.47 |
| Material #4 | | % PTFE 2.0 | Liquid 50ml/100g. | | | |
| Air Flow Rates SCFM/Ft.$^2$ | 10 | 20 | 30 | 40 | 50 | 60 |
| Polysulfide Produced Moles | .069 | .166 | .246 | .290 | .316 | .302 |
| As glp S° | 2.21 | 5.31 | 7.87 | 9.28 | 10.11 | 9.66 |
| Material #5 | | % PTFE 2.0 | Liquid 100ml/100g. | | | |
| Air Flow Rates SCFM/Ft.$^2$ | 10 | 20 | 30 | 40 | 50 | 60 |
| Polysulfide Produced Moles | .090 | .164 | .224 | .256 | .270 | .248 |
| As glp S° | 2.88 | 5.25 | 7.17 | 8.19 | 8.64 | 7.94 |
| Material #6 | | % PTFE 7.5 | Liquid 75ml/100g | | | |
| Air Flow Rates SCFM/Ft.$^2$ | 10 | 20 | 30 | 40 | 50 | 60 |
| Polysulfide Produced Moles | .086 | .167 | .202 | .220 | .201 | .208 |
| As gpl S° | 2.75 | 5.34 | 6.46 | 7.04 | 6.43 | 6.66 |
| Material #7 | | % PTFE 0.9 | Liquid 75ml/100g | | | |
| Air Flow Rates SCFM/Ft.$^2$ | 10 | 20 | 30 | 40 | 50 | 60 |
| Polysulfide Produced Moles | .100 | .198 | .270 | .327 | .322 | .241 |
| As gpl S° | 3.20 | 6.34 | 8.64 | 10.46 | 10.30 | 7.71 |

TABLE III-continued

| Material #8 | | % PTFE 4.2 | Liquid 125ml/100g | | | |
|---|---|---|---|---|---|---|
| Air Flow Rates SCFM/Ft.$^2$ | 10 | 20 | 30 | 40 | 50 | 60 |
| Polysulfide Produced | | | | | | |
| Moles | .074 | .164 | .194 | .194 | .160 | .160 |
| As gpl S$^o$ | 2.37 | 5.25 | 6.21 | 6.21 | 5.12 | 5.12 |
| Material #9 | | % PTFE 4.2 | Liquid 25ml/100g | | | |
| Air Flow Rates SCFM/Ft.$^2$ | 10 | 20 | 30 | 40 | 50 | 60 |
| Polysulfide Produced | | | | | | |
| Moles | .104 | .203 | .278 | .348 | .352 | .299 |
| As gpl S$^o$ | 3.33 | 6.50 | 8.90 | 11.14 | 11.26 | 9.57 |
| Material #10 | | % PTFE 7.5 | Liquid 25ml/100g | | | |
| Air Flow Rates SCFM/Ft.$^2$ | 10 | 20 | 30 | 40 | 50 | 60 |
| Polysulfide Produced | | | | | | |
| Moles | .118 | .235 | .322 | .369 | .364 | .334 |
| As gpl S$^o$ | 3.77 | 7.52 | 10.30 | 11.81 | 11.65 | 10.69 |

Runs with materials Nos. 2 (liquid = 100ml/100g) and 8 (liquid = 125ml/100g) illustrate what happens when a nearly uniform PTFE deposition (because of the higher amounts of liquid used) is achieved. The amounts of polysulfide produced in these runs is in almost all instances below that produced in the other runs. Likewise the peak polysulfide production (at the individual optimum air flow) in each instance is lower than with the other runs. Run 5 also used 100ml/100g but at the lower PTFE amount the effect was not as great as in runs 2 and 8. All of the remaining runs were cases using well less than 100ml/100g. liquid and all performed with improved efficiency (particularly at the optimum air flow for each).

While the method and article herein described constitutes a preferred embodiment of the invention, it is to be understood that the method and article is not limited to this precise method and article, and that changes may be made therein without departing from the scope of the invention which is defined in the appended claims.

What is claimed is:

1. A method for preparing wetproofed carbon particles comprising:
   a. mixing a measured amount of carbon particles having a size between 2 and 30 mesh with 0.6 – 20 percent by weight polytetrafluoroethylene resin, said polytetrafluoroethylene resin being in an aqueous emulsion, and said aqueous emulsion being added to said carbon particles in amounts of less than approximately 100ml/100 grams, and
   b. heating for a sufficient period of time to drive off the water from said aqueous emulsion and thereby setting said polytetrafluoroethylene resin as deposited non-uniformly on said carbon particles to yield a mixture of polytetrafluoroethylene coated carbon particles, some having a higher weight percent polytetrafluoroethylene resin thereon and others having a lower weight percent polytetrafluoroethylene resin thereon.

2. A method as in claim 1 wherein 2 – 10 percent by weight of polytetrafluoroethylene resin is used.

3. A method as in claim 2 wherein said aqueous emulsion is added to said carbon particles in amounts of less than approximately 50ml/100 grams.

4. A method as in claim 3 wherein 6 – 8 percent by weight of polytetrafluoroethylene resin is used and said aqueous emulsion is added to said carbon particles in an amount of approximately 25ml/100 grams.

5. A method as in claim 4 wherein said carbon particles are approximately 4 × 10 mesh in size.

6. A product produced by the method of claim 1.

* * * * *